Sept. 1, 1970  S. G. SHARROCK  3,526,491
APPARATUS FOR CONVEYING AND SHAPING GLASS
ON A FLUID SUPPORT BED
Filed April 21, 1967  5 Sheets-Sheet 2
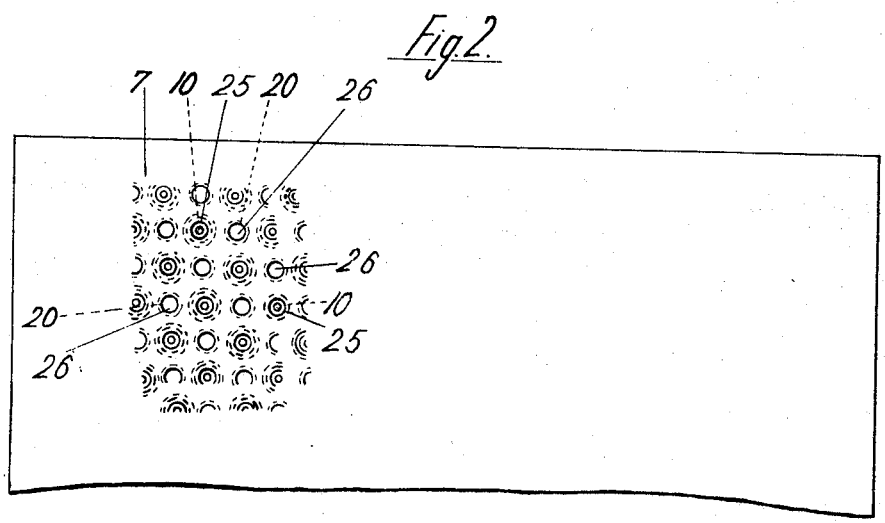
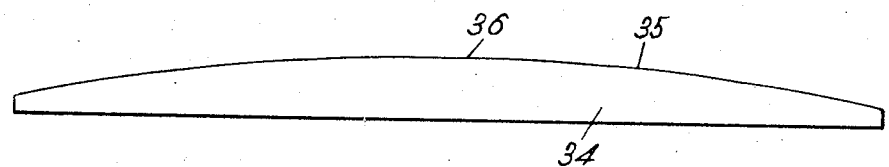
Inventor
Stanley Gordon Sharrock
By
Morrison, Kennedy & Campbell
Attorneys

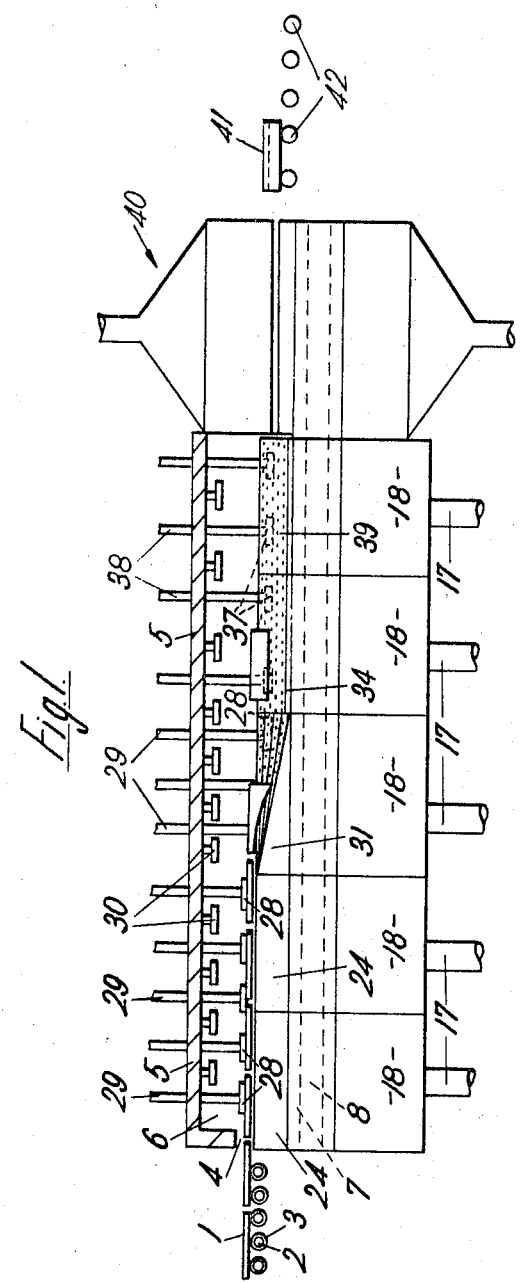

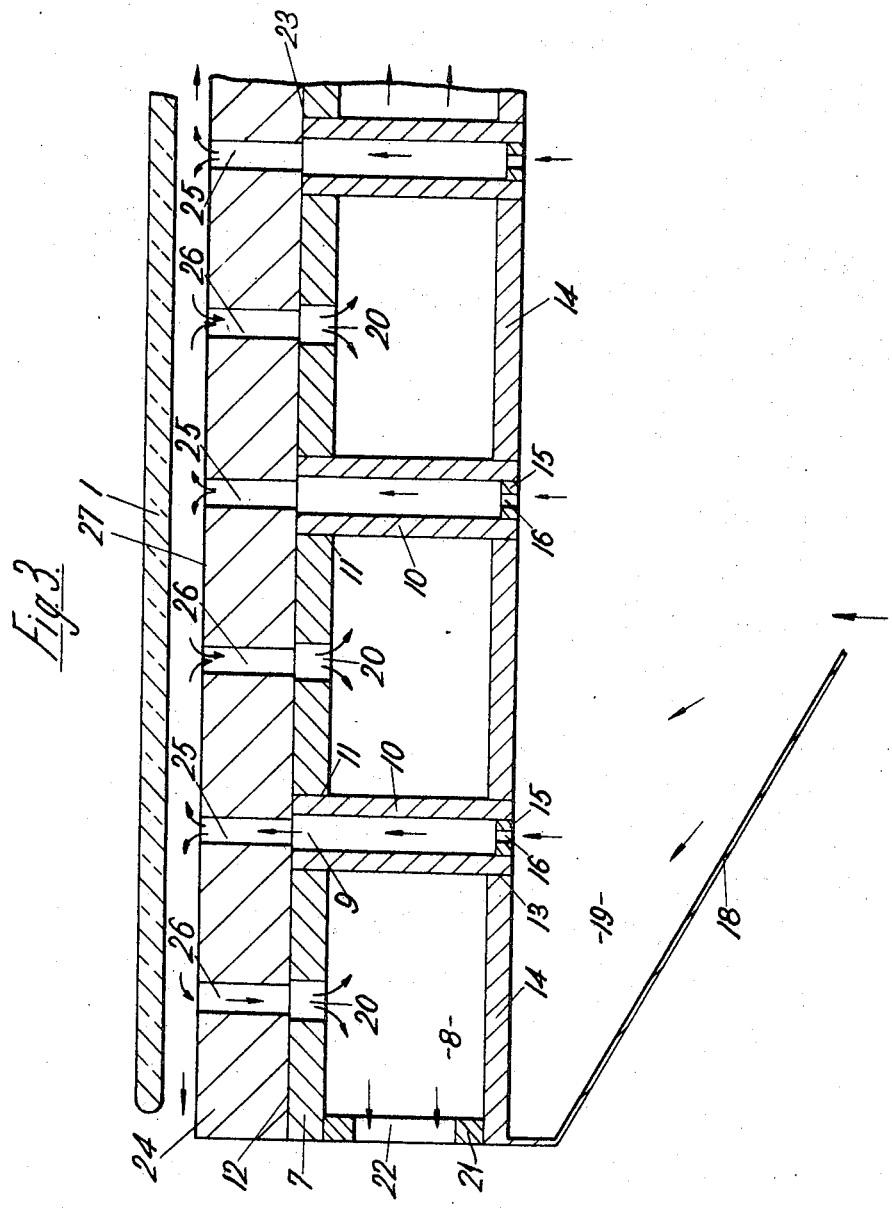

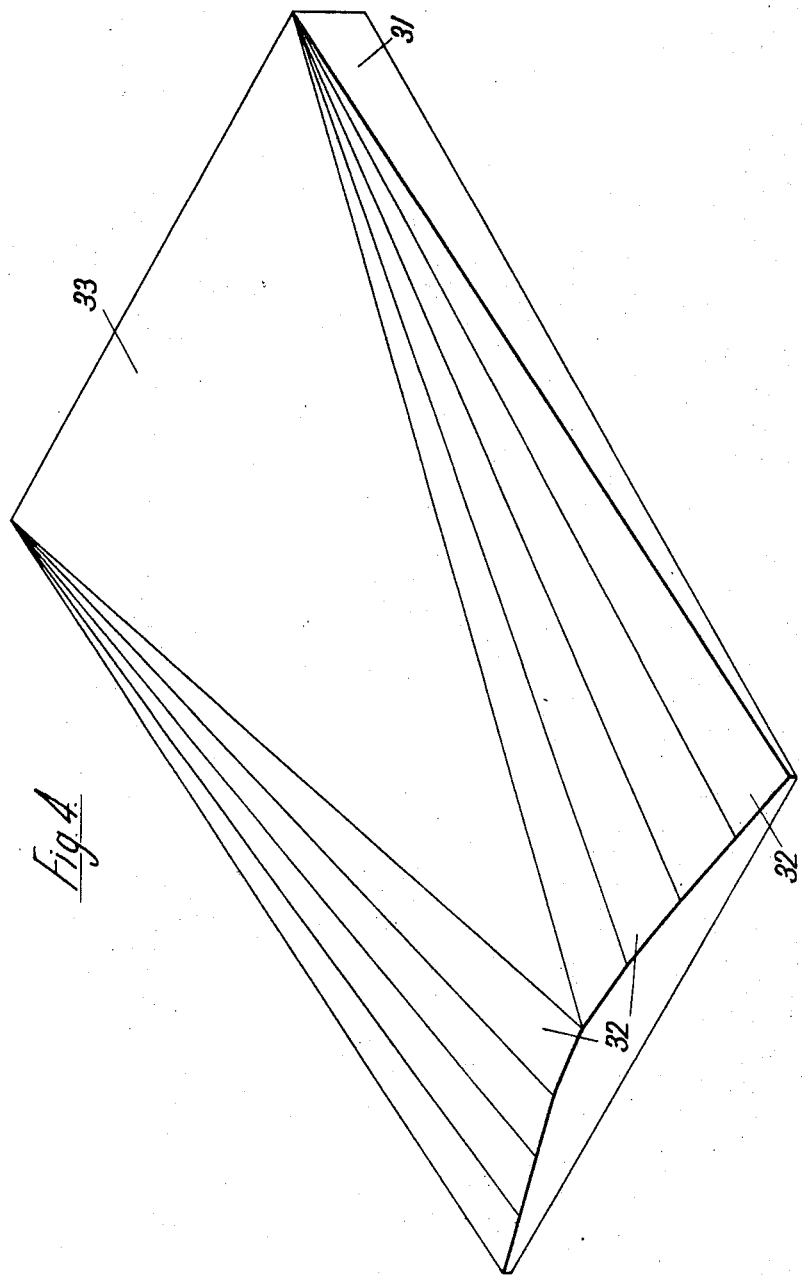

Sept. 1, 1970           S. G. SHARROCK           3,526,491
APPARATUS FOR CONVEYING AND SHAPING GLASS
ON A FLUID SUPPORT BED
Filed April 21, 1967                       5 Sheets-Sheet 5
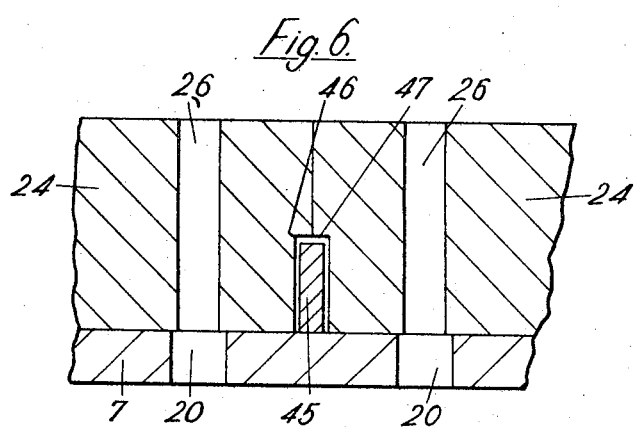
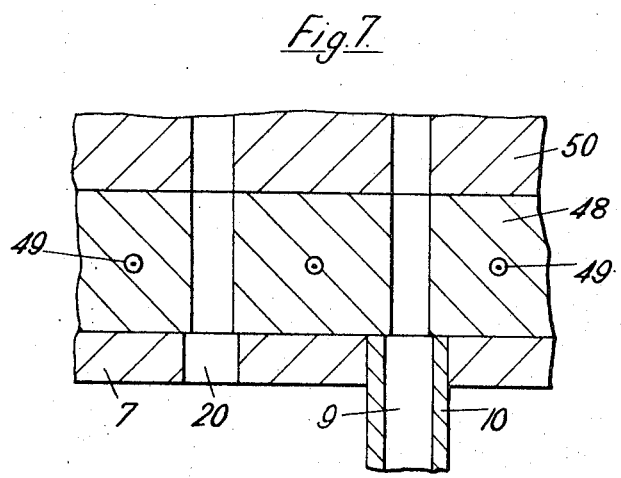
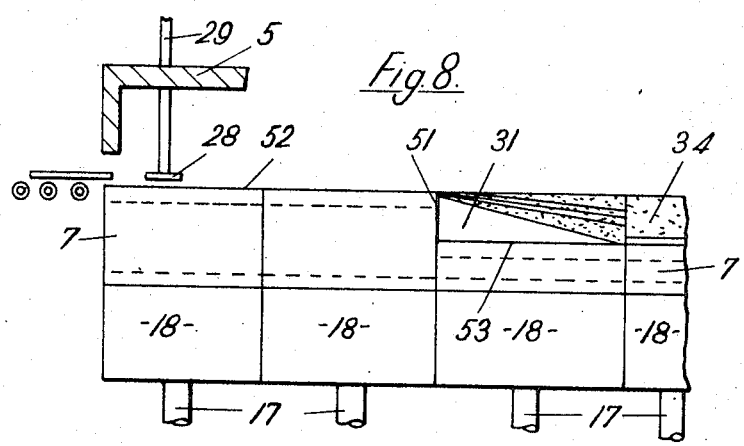
Inventor
Stanley Gordon Sharrock
By
Morrison, Kennedy & Campbell
Attorneys United States Patent Office 3,526,491
Patented Sept. 1, 1970

3,526,491
APPARATUS FOR CONVEYING AND SHAPING GLASS ON A FLUID SUPPORT BED
Stanley Gordon Sharrock, Wigan, England, assignor to Pilkington Brothers Limited, Liverpool, England, a corporation of Great Britain
Filed Apr. 21, 1967, Ser. No. 632,794
Claims priority, application Great Britain, Apr. 25, 1966, 18,075/66
Int. Cl. C03b 18/00
U.S. Cl. 65—182        7 Claims

ABSTRACT OF THE DISCLOSURE

Apparatus for the transporting of sheets of glass including an apertured bed over which the glass sheets are supported by a cushion of gas created over the bed by the passage of the glass, gas being supplied to and evacuated from the cushion through the apertured bed, and the surface of the bed being defined by interchangeable surface elements so that a uniform gaseous support is achieved for varying shapes of glass sheets by appropriate interchange of surface elements.

BACKGROUND OF THE INVENTION

Field of the invention

This invention relates to apparatus for transporting glass in sheet form face downwards and has for one object to improve apparatus of the kind in which the glass is heated in transit up to a temperature at which it can be deformed to a predetermined desired shape and in which changes in the desired shape of the end product can be effected with a minimal alteration in the apparatus.

Description of prior art

Heretofore it has been proposed to transport glass on a layer of gas (usually air) under pressure created over a bed, through which bed the supporting gas is passed and the layer created by the presence of the glass over the bed, the bed being formed with outlets through which gas in the layer is released through the bed in such a manner that the glass is uniformly supported by the layer as it passes along the bed. U.K. Pat. No. 224,713 shows a bed (which may be flat or curved) of metal, through which bed ducts leading from a plenum chamber open at the surface of the bed. In such construction there is a multiplicity of such ducts and closely adjacent to each are ducts leading away from the surface of the bed, either to atmosphere or to a chamber at negative pressure, the arrangement of adjacent supply and release ducts provides short paths for flow of gas in the layer and is such that glass passing over the bed is uniformly supported so that the glass retains its pristine form during transit.

It has also been proposed to change the shape of a stationary glass in sheet form while it is supported on a gaseous layer. In such apparatus, the bed is formed of an agglomeration of refractory powdered material which bed comprises a multiplicity of tortuous passages through which gas under pressure is continually supplied to the bed surface, so that a uniform support for the glass is achieved when the glass has adopted its desired final form.

The present invention involves a novel principle of bed construction consisting in forming a laminar type or built-up type of bed structure with interchangeable members so that the operating surface of the composite bed can be varied according to the shape of the glass advanced over the uppermost elements of the bed, or a change of shape of the glass can be achieved as the glass is advanced over the bed.

SUMMARY

According to the invention aparatus for transporting glass in sheet form on a cushion of gas created by passage of the glass over an apertured bed through which gas is supplied under pressure into the cushion and through which commensurate quantities of gas are evacuated from the cushion to achieve a uniform gaseous support transversely of the cushion, is characterised in that the surface of the apertured bed is defined by interchangeable surface elements of the bed, whereby a uniform gaseous support is achieved for varying shapes of glass in sheet form by appropriate interchange of surface elements to alter the longitudinal configuration of the bed.

This invention thus provides apparatus for transporting flat or curved sheets of glass on a cushion of gas, the interchangeability of the surface elements of the bed giving facility for a rapid change of the longitudinal configuration of the bed when the transporting of glass sheets of one shape ends and sheets of a different shape are to be transported.

The shape of the glass sheets may be changed as they are transported on the cushion of gas created over the apertured bed by the passage of the sheets. The glass sheets may initially be hot enough to permit a change of shape or may be heated as they pass over the initial part of the bed.

Accordingly in one embodiment of the invention a cushion of hot gas is created under the glass and the surface elements constitute a continuous progressive change in configuration of the bed in the direction of advance of the glass in order to produce a corresponding change in shape in the glass in sheet form during transit of the hot glass over the apertured bed.

Further according to the invention apparatus for transporting glass in sheet form on a gaseous support through heating stations, wherein the bed over which the gaseous support is created by a sheet of glass as it is urged thereover, comprises a base plate which is uniformly apertured for the release of hot gases through the plate into the cushion and which plate is provided with equally interspersed exhaust openings to permit regulated exhaust of gases from the cushion, the upper surface of the plate being formed to receive in intimate engagement the lower faces of a series of interchangeable surface elements whose upper surfaces define a desired bed surface, and which are provided with gas release and exhaust apertures in register with the apertures in the base plate, so that the transverse pressure distribution in the cushion created by the glass passing over the bed surface is adaptable to give a transverse pressure distribution which permits the glass to assume a desired form.

Accordingly the present invention comprehends a variable bed structure in the sense of ability to change the operating surface of the bed, in contradistinction to prior proposals which only permitted the production of one shape of end product.

The reference to glass in sheet form comprehends flat glass or flat glass which has been bent to concave or convex form and accordingly the original bed may be flat or curved to match the configuration of the glass in sheet form to be transported through the heating stages. When suitably heated the glass may be coated in a process of ornamenting the glass or coating the glass for a particular service, for example for use as a mirror.

Apparatus according to the invention may include a quenching station in which the heated glass sheets are quenched and from which there emerges a toughened glass element which is either flat or bent.

In a preferred apparatus according to the invention the base plate is of heat resistant stainless steel and has an accurately flat upper surface, and the removable surface elements are also of stainless steel, having their lower surfaces accurately flat so as to be slid into intimate gas-tight engagement with the upper surface of the base plate.

For the treatment of flat glass to produce bent glass elements the glass is gradually heated up to deformation temperature while supported on the gaseous support and the bed defines first a flat surface for the transporting of the flat sheets of glass to be bent, then an interchangeable transition surface element which initiates a progressive change of shape of the hot deformable sheets of glass to a desired curved shape prior to advance of the glass from the transition surface to a final part of the bed whose configuration is such that the transverse pressure distribution created under the advancing glass permits the glass to assume a final desired curved form.

The progressive change of shape is initiated either by the sagging of the blass, or by the application of a gaseous pressure applied to the outer surface of the glass, i.e. the surface opposite that supported on the gaseous support when the change is positively imposed by air pressure.

As is expressed in the aforesaid United Kingdom patent specification No. 224,713, the expression "bed" used herein is intended to cover a bed which is horizontally disposed or vertically disposed or inclined.

The progressive change of shape may be achieved by imposing a bend on the glass by gaseous forces acting simultaneously on both faces of the glass as it is advanced over the bed.

Heating elements may be incorporated in the surface elements of the bed, there being independent regulation of the heating elements in the surface elements as well as regulation of radiant heaters located in the heating stations above the path of travel of the glass sheets to assist in progressive heating of the glass in transit through the heating stations. Heating elements in the surface elements may be employed to provide additional heating near the sides of the path of travel of the glass sheets so as to assist the enforcing of a bend of the marginal areas or the sheets. Each section of the bed may be made up of a number of blocks which are in abutment and together define a composite surface element so that block portions carrying additional heating elements may be substituted in the sides of the bed where desired.

The bed, being of a laminar structure, may include apertured substrate elements fitted on to the base plate with removable cover members in intimate contact with the upper surfaces of the substrate elements to define the shaped bed surface.

The apertured substrate elements may incorporate independently regulated heating elements.

In order to assist the accurate location of the surface elements on the base plate when they are slid into the apparatus from one side of the bed the base plate may include upstanding transverse guides for assisting location of the surface elements in desired relation to each other. This facilitates the interchange of surface elements when for example it is desired to change the curvature of the glass being transported.

When the apparatus is to be employed only for the treatment of flat sheets of glass in order to produce toughened curved glass elements from the flat sheets, the base plate may be formed with a step between an upper level of the base plate constituting the flat upper surface of the bed initially supporting flat sheets of glass delivered to that initial part of the bed, and a lower level of the base plate for receiving the interchangeable surface elements forming a surface continuous with the initial upper level of the base plate but progressively changing in configuration to permit the hot glass to assume the desired curvature as it is advanced.

Where the glass being transported is bent apparatus according to the invention may be employed for returning the glass to pristine flatness, in which case the upper surface of the bed initially conforms to the bent form of the glass and progressively changes to a flat bed to provide the gradual change of the glass to its pristine flatness during transit over the gaseous support. This is particularly effective when the glass being transported has a shallow bent form.

BRIEF DESCRIPTION OF THE DRAWINGS

FIG. 1 is a side elevation partly in section of apparatus according to the invention for transporting glass in sheet form on a cushion of gas as it is heated, then bending the glass to a desired shape before quenching the shaped glass, FIG. 2 is a plan view of a part of the upper face of the bed above which the gaseous support is created by the advancing glass, FIG. 3 is a sectional view of a marginal region of the bed showing the glass supported above the bed, FIG. 4 is a pictorial view of a transition surface element but omitting the gas release and exhaust apertures, for the sake of clarity, FIG. 5 is an end elevation of an adaptor surface element of the bed which element abuts against the end of the transition element, FIG. 6 is a sectional detail taken longitudinally of the bed across the abutting faces of two adjacent surface elements of the bed showing a modification of the bed to assist registration of the surface elements, FIG. 7 is a sectional detail illustrating a bed according to the invention of laminar form having removable cover members, and FIG. 8 illustrates a modification of the bed in which the first section of the bed is not interchangeable.

DESCRIPTION OF THE PREFERRED EMBODIMENTS

Referring to FIG. 1 of the drawings there is shown apparatus for transporting glass in sheet form on a gaseous support through heating stations in an apparatus for the production of toughened glass elements. The particular embodiment illustrated in the drawings shows the production of curved toughened glass sheets.

Flat sheets of glass 1 to be shaped and toughened are fed in sequence on to asbestos covered conveyor rollers 2 at the loading end of the apparatus. The rollers 2 have collars 3 at one end of slightly larger diameter than the major surface of the rollers, and the glass sheets are loaded on the rollers preferably with one edge of each sheet engaging the collars 3. The conveyor rollers are inclined at a slight angle to the horizontal, for example at an angle of about 5° so that the glass sheets 1 tend to engage the collars 3.

The sheets 1 are fed in sequence by the driving rollers 2 through the inlet 4 into a structure comprising heating stations. The heating stations are defined within a tunnel-like structure between a roof structure 5 which has side walls 6, and a base bed structure which generates the gaseous support for the sheets of glass. The bed over which the gaseous support is created as each sheet of glass is urged thereover comprises a base plate 7 which is a flat plate of heat-resistant stainless steel and which forms the roof of an exhaust chamber 8, see FIG. 3. The plate is uniformly apertured for the passage of hot gases from outlet apertures 9.

Each of the apertures 9 for the passage of hot gases upwardly through the base plate 7 is defined by the bore of a supply tube 10 which is fitted into a hole 11 in the base plate. The tops of the tubes 10 are flush with the top surface 12 of the base plate 7. The tubes 10 depend downwardly from the base plate 7 and are located at their lower ends in holes 13 in a floor 14 of the exhaust chamber 8. At their lower ends each of the tubes 10 is fitted with a restrictor disc 15 having a restrictor orifice 16 in its centre. This assists equalisation of pressure of hot gases flowing upwardly in all the hot gas supply tubes 10. The hot gases are supplied through ducts 17, see FIG. 1, underneath the apparatus and each duct 17 communicates with a plenum chamber having splayed side walls 18, FIG. 3. The slope of the side walls 18 is indicated in FIG. 3 and the floor 14 of the exhaust chamber 8 forms the roof of the plenum chamber 19.

The base plate 7 is also provided with equally interspersed exhaust openings 20 communicating with the exhaust chamber 8 which chamber has apertured side and end walls 21. Each outlet aperture 22 in the walls 21 allows gases entering the exhaust chamber through apertures 20 to be exhausted to atmosphere.

The upper face 12 of the base plate 7 is an accurately flat surface formed to receive in intimate engagement the lower faces 23 of a series of removable surface elements in the form of stratum blocks 24. These blocks 24 are machined from heat resistant stainless steel and their lower faces are machined flat so that they can be slid into the apparatus from one side into intimate gas-tight engagement with the upper surface 12 of the base plate. The blocks 24 are each provided with gas escape apertures 25 and gas exhaust apertures 26 which are indicated more clearly in FIG. 2 which is a plan view of a small part of one corner of a block 24 indicating a small area of the apertures formed in the block and showing how these apertures are aligned at a small angle, e.g. about 5° to the direction of advance of the glass through the heating stations.

The apertures 25 and 26, as shown in FIG. 3, are of slightly lesser diameter than the apertures 9 and 20 in the base plate 7 in order to assist registration of the apertures 25 and 26 of the block over the apertures 9 and 20 in the base plate when the block 24 is slid into position on the base plate.

The gas-tight engagement of the lower face 23 of the block 24 with the upper face 12 of the base plate 7 precludes loss of pressure of the regulated upward flow of hot gases through the tubes 10. The gases then proceed upwardly through apertures 25 in the block 24 and the regulated escape and expansion of the hot gases above the upper surface 27 of the block 24, creates a gaseous support under the advancing glass sheets 1. The glass sheets pass above the bed surface in a direction perpendicular to the plane of FIG. 3. Gas is continually released from the apertures 25 into the gaseous support for each glass sheet 1 and simultaneously gas escapes from the gaseous support through the exhaust apertures 26 and 20 into the exhaust chamber 8 and thence to atmosphere. The upper surfaces 27 of the stratum blocks 24 over which the gaseous support is created are transversely tilted so as to lie at the same small angle to the horizontal as the conveyor rollers 2, and the upper surfaces of the conveyor rollers 2 are slightly higher than the level of the upper surface 27 of the first stratum block, so that as soon as each glass sheet 1 becomes completely and uniformly supported on the gaseous support it tends to slide down the transverse incline until it is in engagement with rotating discs 28 mounted alongside the blocks 24 on vertical spindles 29 extending downwardly through the roof structure 5 and driven in any well-known manner at a controlled speed commensurate with the rate of advance of the sheets of glass 1 on to the gaseous support by the conveyor rollers. If the sheets 1 were already touching the collars 3 on the rollers 2 then they will be in a position to be driven by the edge discs 28 without any substantial movement of the sheets relative to the transversely sloping upper surfaces of the blocks 24.

The sheets 1 are placed on the conveyor rollers in abutment end-to-end so that a train of flat glass sheets 1 is advanced into the apparatus by the driving action of the conveyor rollers 2, 3.

In the embodiment illustrated in FIG. 1 there are two flat stratum blocks 24 which form a first part of the heating arrangement and as the sheets advance on the gaseous support created by them over those blocks they become heated by the hot gases and by radiant heat from heaters 30 mounted in the roof structure over the path of travel of the glass sheets. Although the forward drive of the sheets is derived from the conveyor rollers, further edge discs 28 may be provided to maintain the registration of the glass sheets on the initially flat part of the bed. These edge discs 28 may also provide some drive for assisting the forward movement of the sheets but in some instances they may be free running and then only act as guides for the sheets which lie in engagement with these rotatable guides.

By the time the glass sheets 1 reach the end of the second flat block 24 the glass is at a temperature at which it is deformable but the creation underneath each glass sheet of the uniform gaseous support above the flat upper surface 27 of the block 24 ensures that no deformation of the glass takes place as the glass is heated.

The glass then reaches the third block 31 of the series of surface elements engaged on the base plate 7, the upper surface of which block 31 defines a transition surface which initiates a progressive change of shape of the hot deformable glass towards a desired curved shape. The transition block 31 is illustrated in more detail in FIG. 4 although the uniformly spaced gas release apertures 25 and interspaced exhaust apertures 26 which are present over the whole surface of the block 31 have been omitted for the sake of clarity. The thickness of the block 31 along its longitudinal centre line is the same as the thickness of the two flat blocks 24 and there are machined from the upper face of the block 31 a series of flats 32 of gradually increasing angle which result in the upper surface of the block 31 having a final cross section which approximates to the final desired curved form of the glass sheets. This leaves a flat upper surface 33 of a triangular form in the same plane as the flat upper surfaces 27 of the first two blocks 24.

The glass advance on to the transition block 31 and owing to the shape of the upper surface of the block 31, the gaseous support created beneath the hot deformable glass as it glides over the beginning of the flat top surface 33 of the block 31, is adapted by the machined shape of the upper surface of the block to give a transverse pressure distribution such that a downward sagging of the sides of the glass sheet is initiated.

This downward sag increases progressively as the glass sheet advances over the block 31, and further rotating discs 28 are positioned along one side of the block 31 for engagement by one longitudinal edge of each glass sheet to assist the advance of the sheet over the block 31. These further rotating discs 28 are driven at such a speed that the glass gradually draws away from the succeeding sheet of glass with which it had been in abutment in the manner described above.

As the sheet passes over the block 31 it curves to a shape conforming to the section of the end of the block 31 at the apex of the top triangular flat surface 33 (FIG. 4).

The glass is still hot and deformable and moves from the block 31 to a final part of the bed, constituted by a further interchangeable stratum block 34 which is in intimate engagement with the base plate 7 and is apertured in the same way as the flat blocks 24 and the transition block 31, that is in the manner illustrated in FIG. 2 and FIG. 3, but has a curved upper surface 35, FIG. 5, whose configuration is such that the transverse pressure distribution created under the advancing glass permits the glass to assume a final desired curved form. This curved surface 35 is illustrated in FIG. 5 which is an end elevation of the block 34. The highest point 36 of the upper surface 35 of the block 34 is still on the same level as the apex of the triangular part 33 of the block 31 and the upper surface 27 of the blocks 24, although the whole of the bed may have a slight downward slope in the direction of travel of the glass so as to assist, by gravity, forward movement of the glass sheets through the apparatus.

The release of hot gas through the apertures 25 in the block 34 is so controlled by the shape of that block as to provide beneath the glass advancing from the transition block 31 a transverse pressure distribution in the gaseous support for the glass which enforces a final desired curved form on the glass.

This curved form is consolidated as the glass is advanced over the block 34. Edge discs 37 are mounted on spindles 38 extending through the roof structure 5 and advance the glass over the block 34. The discs 37 are at a lower level than the edge discs 28 so as to engage the longitudinal edges of the curved glass (see FIG. 1). The advance of the glass continues over a second interchangeable curved block 39 identical to the block 34 so that the uniform gaseous support for the hot glass is provided during the whole of its travel through the heating stations.

The glass thus bends to and finally is made to conform to a desired configuration and is then passed to a quenching station indicated generally at 40. The quenching station is comprised by lower blocks of refractory material for example compressed asbestos material, which are also interchangeable and have a curved upper surface conforming to the now formed curve of the bent glass sheets. The blocks in the quenching station overlie a base plate constructed as shown in FIG. 1 and the glass is still supported on a gaseous support in this quenching station by flows of cold air into the gaseous support beneath the glass, which flows take part in the tempering. There is in register with the removable blocks a correspondingly curved upper quenching box mounted above the path of travel of the glass. There are edge discs similar to the discs 37 in the quenching station so as to advance the glass sheets continuously and at a controlled rate through that station and thereafter the curved toughened glass sheets 41 advance on conveyor rollers 42 to an unloading station. The edges only of the toughened sheets rest on the rollers.

The interchangeable blocks 24, 31, 34 and 39 give to the bed above which the gaseous support is created a laminar construction and when it is desired to change from the production of flat sheets to the production of curved sheets, or to produce glass sheets bent to a different curved section or to return to the production of flat glass sheets or indeed to return curved glass sheets to pristine flatness, all that is necessary is that the appropriate ones of the blocks 24, 31, 34 and 39 have to be replaced.

This is a minimal alteration of the apparatus as the base plate 7 provides a fixed register surface on which the different interchangeable surface element blocks are received in intimate engagement so that the upper surfaces of the blocks always provide continuously shaped upper bed surfaces over which the desired transverse pressure distribution is achieved corresponding to the configuration for the glass sheets to be produced. If it is desired to change the curvature of the glass sheets then only the transition block 31 and the final blocks 34 and 39, together with the lower block alone or both the upper and lower blocks of the quenching station, have to be changed and as the blocks are simply locked to the base plate 7 in order to maintain the desired registration between the apertures in the blocks and the base plate, the changing of blocks is a simple operation which can be carried out with a minimum break in production. Blocks can be changed without allowing the plant to cool to the ambient temperature if the replacement blocks are preheated in a side furnace for rapid transfer to the appropriate heating station.

If desired, the base plate 7 may be provided with upstanding transverse guides, 45, as shown in FIG. 6, over a central part of the base plate, there being corresponding rabbets 46 and 47 cut in the front and rear faces of the blocks to slide over the guides 45 thereby assisting location of the blocks in desired position relative to each other as they are slid onto the base plate 7 from one side of the bed. The guide 45 is illustrated between the first two blocks 24 of the bed. Additionally, stops, not shown, may be provided for abutment by an abutment face on each of the blocks as it is slid into position on the base plate, to assist the correct location relative to one another of the upper surfaces of the blocks forming the continuous bed surface over which the glass is advanced.

Heating elements may be provided in the blocks and these heating elements can be independently regulated. For example, it may be desirable to raise the temperature of the side margins of the glass sheets slightly relative to the central part of the sheets in order to assist the bend. This may be done partly by the placing of the radiant heaters in the roof but differential heating transversely across the bed, in particular across the transition block 31 may be advantageous in some applications.

Further, as illustrated in FIG. 7, the bed of laminar form may include apertured substrate elements 48 fitted onto the base plate 7 and incorporating independently regulated electric heating elements 49. These substrate elements could form the main part of the thickness of the bed above the base plate 7 with removable cover elements 50 in intimate contact with the upper surfaces of the substrate elements 48 to define the shaped bed surface, which is exaggerated in FIG. 7 for clarity. Thus, the substrate blocks may be surmounted by removable covers which define the transition curvature of the block 31 and the desired uniform curvature of the blocks 33 and 38. The interchangeable blocks may be of composite nature in that surface elements constituted by the cover members have a much smaller thickness than the substratum block so that less effort is required when a changeover is made.

The extent of curvature accepted by the glass is greatly exaggerated in the drawings, and this substrate construction is of particular advantage when bending glass sheets to a very slight curvature. This slight curvature can be altered by replacement of the removable cover members or by the building up of further cover members on top of the covers on the substrate.

In another modification of the apparatus illustrated in FIG. 8, the base plate 7 may be formed with a step 51 between the initial upper level 52 of the base plate, constituting a flat upper surface of the bed which initially supports the advancing flat sheets of glass as they become supported on the gaseous support and move from the conveyor rollers. This upper part of the base plate corresponds to the upper surface of the first two blocks 24 in the embodiment of FIG. 1. Thereafter the upper face of the base plate is at a lower level 53 for receiving the interchangeable blocks 31 and 34 whose upper surfaces form the continuous surface with the initial upper level 52 of the base plate.

Heat resistant stainless steel is employed for the base plate and the interchangeable apertured blocks in the embodiment described but other refractory materials may be employed, for example the apertured stratum blocks may be made of a compressed powdered refractory material which is permeable to gas under pressure so that gas permeating through the porous material augments the release of hot gas through the apertures 25 in the blocks.

The invention thus provides a novel and advantageous bed construction which is flexible in the sense of an ability for easy and rapid change of the operating surface of the bed above which gaseous support is created for the transporting of sheets of glass.

I claim:

1. Apparatus for transporting glass in sheet form on a cushion of gas disposed between the glass sheet and an apertured bed, the bed comprising a base plate having gas discharging and exhaust apertures and a series of separate interchangeable surface elements having a like number of gas discharging and exhaust apertures in register with the apertures of said base plate, said separate surface elements being disposed end to end along the base plate and having upper surfaces defining the desired longitudinal and transverse shape of the bed, varying shapes being achieved by appropriate interchange of one or more of the surface elements.

2. Apparatus according to claim 1, wherein the base plate is located above a plenum chamber, gas being ducted from the plenum chamber to said gas inlet apertures in the base plate by tubes passing through an exhaust chamber connected to said exhaust apertures.

3. Apparatus according to claim 1, wherein the base plate is of heat resistant stainless steel and has an accurately flat upper surface, and the interchangeable surface elements are also of stainless steel, having their lower surfaces accurately flat so as to be slidable into intimate gas-tight engagement with the upper surface of the base plate.

4. Apparatus according to claim 1, wherein the base plate includes upstanding transverse guides for assisting location of the surface elements in their end to end relation.

5. Apparatus according to claim 1, wherein the bed includes apertured substrate blocks fitted on to the base plate and incorporating independently regulated heating elements, with removable cover members in intimate contact with the upper surfaces of the substrate blocks to define the shaped bed surface.

6. Apparatus according to claim 1 for transporting glass in sheet form on a gaseous support through heating stations and for bending the hot glass sheets whilst they are supported on said gaseous support, the shape defined by the surface elements along the advancement path comprising first a flat surface for the transporting of the flat sheets of glass to be bent through the heating stations, then an interchangeable transition surface which initiates a progressive change of shape of the hot deformable sheets of glass to a desired curved shape, and finally a final surface whose shape is such that the transverse pressure distribution created under the advancing glass sheets permits the sheets to assume a final desired curved form.

7. Apparatus according to claim 6, wherein the base plate is formed with a step between an upper level of the base plate constituting said first flat surface of the bed, and a lower level of the base plate which lower level comprises a base for the interchangeable surface elements having the desired shapes of said transition surface and said final surface of the bed.

References Cited

UNITED STATES PATENTS

| | | | |
|---|---|---|---|
| 1,622,817 | 3/1927 | Waldron | 65—182 XR |
| 3,223,501 | 12/1965 | Fredley et al. | 65—182 XR |
| 3,291,590 | 12/1966 | McMaster | 65—182 |
| 3,300,290 | 1/1967 | Misson | 65—25 |
| 3,332,760 | 8/1967 | McMaster | 65—182 XR |
| 3,375,094 | 3/1968 | McMaster | 65—182 XR |

S. LEON BASHORE, Primary Examiner

J. H. HARMAN, Assistant Examiner

U.S. Cl. X.R.

65—25, 273